(12) United States Patent
Chen

(10) Patent No.: US 10,437,076 B2
(45) Date of Patent: Oct. 8, 2019

(54) PAIR OF GOGGLES WITH REPLACEABLE LENSES

(71) Applicant: Lin Yun Chen, Tainan (TW)

(72) Inventor: Lin Yun Chen, Tainan (TW)

(*) Notice: Subject to any disclaimer, the term of this patent is extended or adjusted under 35 U.S.C. 154(b) by 55 days.

(21) Appl. No.: 15/814,409

(22) Filed: Nov. 16, 2017

(65) Prior Publication Data

US 2019/0146240 A1    May 16, 2019

(51) Int. Cl.
*G02C 5/02* (2006.01)
*A63B 33/00* (2006.01)
*G02C 5/00* (2006.01)
*G02C 7/10* (2006.01)

(52) U.S. Cl.
CPC .............. *G02C 5/02* (2013.01); *A63B 33/002* (2013.01); *G02C 5/001* (2013.01); *G02C 7/10* (2013.01); *G02C 2200/08* (2013.01)

(58) Field of Classification Search
CPC .......... G02C 5/02; G02C 5/0014; G02C 7/08; G02C 7/10; G02C 9/00; G02C 13/00; G02C 2200/08; G02C 2200/04; G02C 5/001; A63B 33/002; A63B 33/00; A63B 2033/004

USPC .......... 351/43, 57, 59, 154, 233; 2/426, 428, 2/443

See application file for complete search history.

(56) References Cited

U.S. PATENT DOCUMENTS 6,032,298 A * 3/2000 Chiang .................. A61F 9/025
                                                        2/428
2015/0335956 A1* 11/2015 DiChiara ............. A63B 33/002
                                                        351/43

* cited by examiner

*Primary Examiner* — Jie Lei
(74) *Attorney, Agent, or Firm* — Bruce Stone LLP; Joseph Bruce

(57) ABSTRACT

Provided is a pair of goggles with replaceable lenses, including a main frame body, at least one lens, a secondary frame body, a soft frame body and at least one fastener. The at least one fastener is pivoted when the at least one lens is replaced. The main frame body and the secondary frame body are separated such that the at least one lens is removed. Moreover, when the at least one lens is assembled, the main frame body and the secondary frame body are respectively provided with a pair of grooves, the pair of grooves holds and fix the soft frame body, and the main frame body and the secondary frame body are held by the at least one fastener so that the at least one lens is fixed inside the soft frame body.

14 Claims, 4 Drawing Sheets

PAIR OF GOGGLES WITH REPLACEABLE LENSES

BACKGROUND OF THE INVENTION

1. Field of the Invention

The present disclosure relates to a pair of goggles, and particularly relates to a pair of goggles with replaceable lenses.

2. The Prior Arts

With the continuous progress of technology, glasses in manufacturing technology and materials have many breakthroughs; hence, more and more people wear glasses in sports. The main purpose of wearing glasses is to protect the eyes and to shield the sun.

For health, swimming is a sport that requires physical activity, at the same time, swimming is also a sport that increases vital capacity (VC). Therefore, swimming has become a common sport in summer and in winner.

However, goggles on the market generally have lenses with the same diopter. Wearers who have parallax can only accommodate lenses which have the same diopter. As such, theses wearers cannot swim with normal vision.

Therefore, except for goggles that can be applied to a variety of wearers, the goggles allow the wearer to maintain a clear vision while swimming and also allow the wearer to have the effect of shielding the sun. Moreover, lenses on the goggles can be easily replaced by the wearer. Accordingly, how to provide a better goggles structure is indeed one of the important issues.

SUMMARY OF THE INVENTION

In order to achieve the above objective, according to one preferred embodiment, the present disclosure provides a pair of goggles with replaceable lenses, including a main frame body, at least one lens, a secondary frame body, a soft frame body and at least one fastener, wherein when the at least lens is replaced, the at least one fastener is pivoted for opening; and the main frame body and the secondary frame body are separated so that the soft frame body is taken out and the at least one lens is removed, and wherein when assembling the at least one lens, the main frame body and the secondary frame body are respectively provided with a pair of recesses; the pair of recesses holds and fixes the soft frame body; and the main frame body and the secondary frame body are fastened by the at least one fastener so that the at least one lens is fixed inside the soft frame body.

Preferably, the main frame body comprises a left main frame and a right main frame; the secondary frame body comprises a left secondary frame and a right secondary frame; the left main frame and the right main frame are respectively provided with a connecting hole and a main hole at the bridge of the nose; and the left secondary frame and the right secondary frame are respectively provided with a secondary hole.

Preferably, the present disclosure may further include a connecting piece, wherein the connecting piece connects the left main frame and the right main frame through the connecting hole.

Preferably, the present disclosure may further include a first pivot member, wherein the first pivot member pivots the left main frame and the left secondary frame through the main hole and pivoting the right main frame and the right secondary frame through the secondary hole.

Preferably, the present disclosure may further include a second pivot member, wherein the second pivot member pivots the secondary main frame body and the least one fastener through a first pivot hole on both sides of the secondary frame body and a second pivot hole of the at least one fastener.

Preferably, the main frame body has a main fastening hole on both sides; the secondary frame body has a secondary fastening hole on both sides; and the at least one fastener is buckled into the main fastening hole and the secondary fastening hole so as to fasten the main frame body and the secondary frame body.

Preferably, when replacing or assembling the at least one lens, no tools need to be used.

Preferably, the at least one lens may be one of a non-eyeglass prescription lens, an eyeglass prescription lens and a colored lens.

DETAILED DESCRIPTION OF THE PREFERRED EMBODIMENT

The detailed description of the present disclosure is provided in combination with the accompanying drawings.

Figure 1:
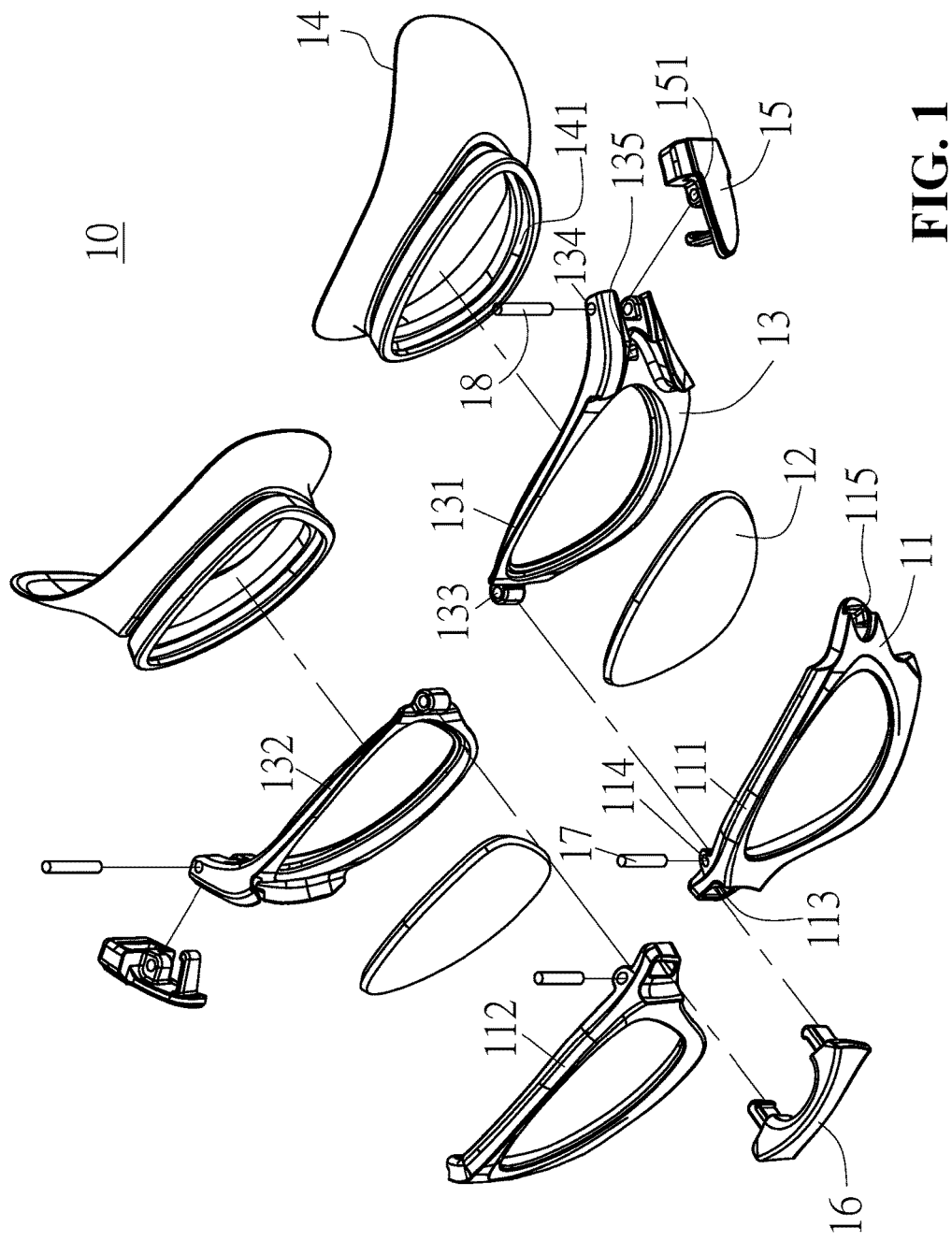
FIG. 1 shows a front-view three-dimensional decomposition diagram of a pair of goggles with replaceable lenses in accordance with a preferred embodiment of the present disclosure.
Figure 2:
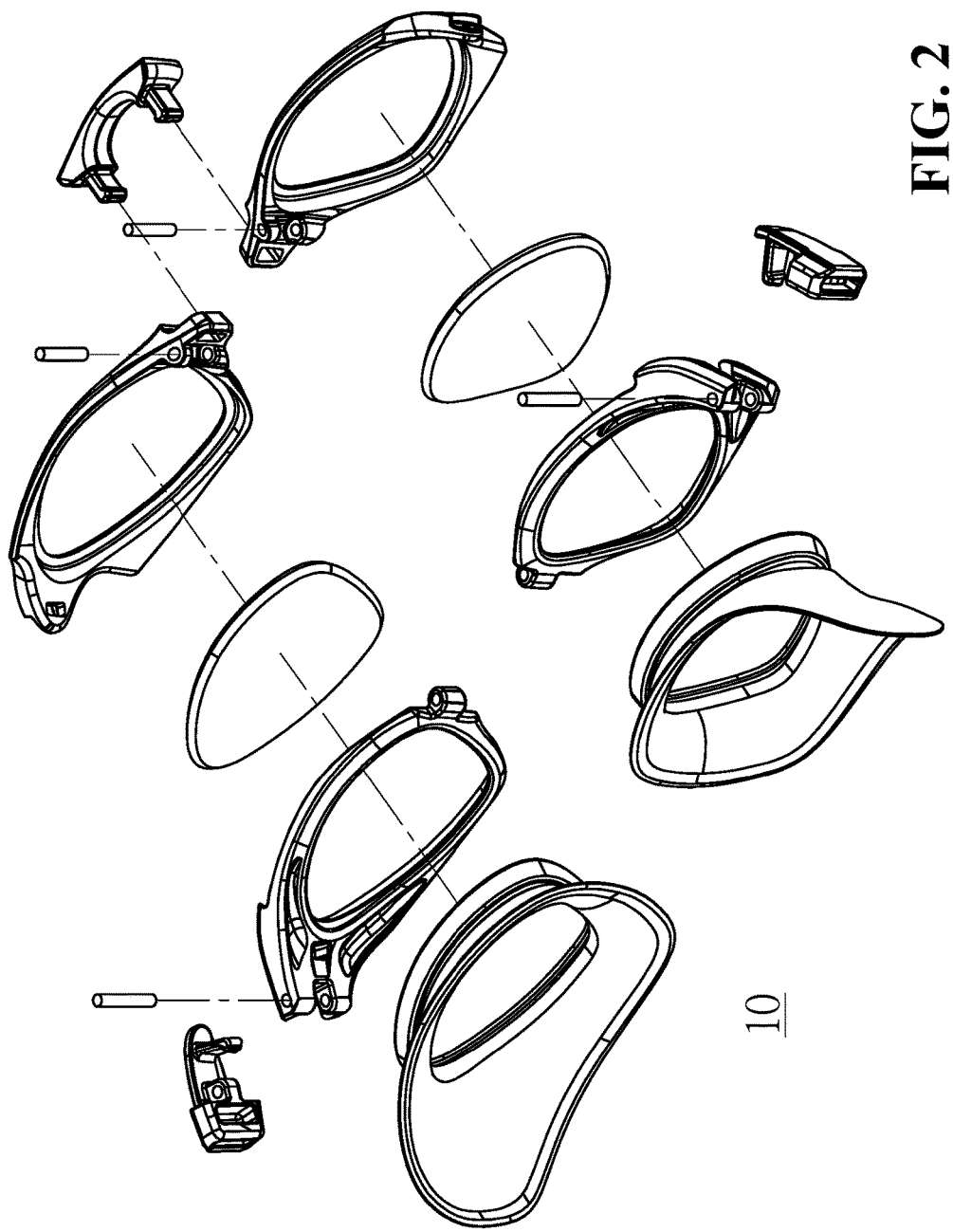
FIG. 2 shows a rear-view three-dimensional decomposition diagram of the pair of goggles with replaceable lenses in accordance with the preferred embodiment of the present disclosure.
Figure 3:
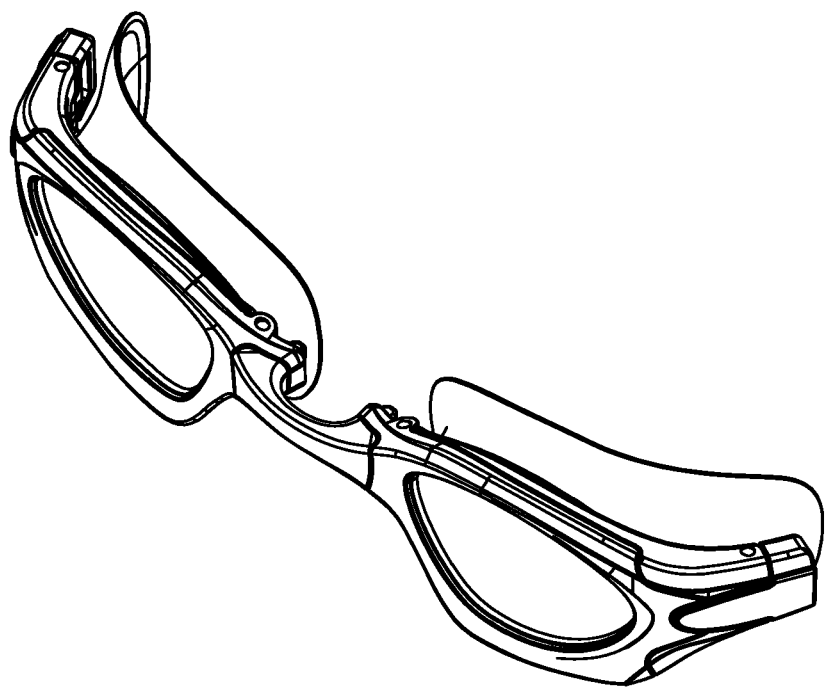
FIG. 3 shows a three-dimensional diagram of the pair of goggles with replaceable lenses in accordance with the preferred embodiment of the present disclosure.

According to a preferred embodiment of the present disclosure, FIG. 1 shows a front-view three-dimensional decomposition diagram of a pair of goggles with replaceable lenses; FIG. 2 shows a rear-view three-dimensional decomposition diagram of the pair of goggles with replaceable lenses; and FIG. 3 shows a three-dimensional diagram of the pair of goggles with replaceable lenses. As shown in FIG. 1, the pair of goggles with replaceable lenses of the present disclosure includes a main frame body 11, at least one lens 12, a secondary frame body 13, a soft frame body 14 and at least one fastener 15.

As shown in FIG. 1 and FIG. 2, the main frame body 11 includes a left main frame 111 and a right main frame 112. The secondary frame body 13 includes a left secondary frame 131 and a right secondary frame 132. The left main frame 111 and the right main frame 112 are respectively provided with a connecting hole 113 and a main hole 114 at the bridge of the nose; and the left secondary frame 131 and the right secondary frame 132 are respectively provided with a secondary hole 133.

Figure 4:
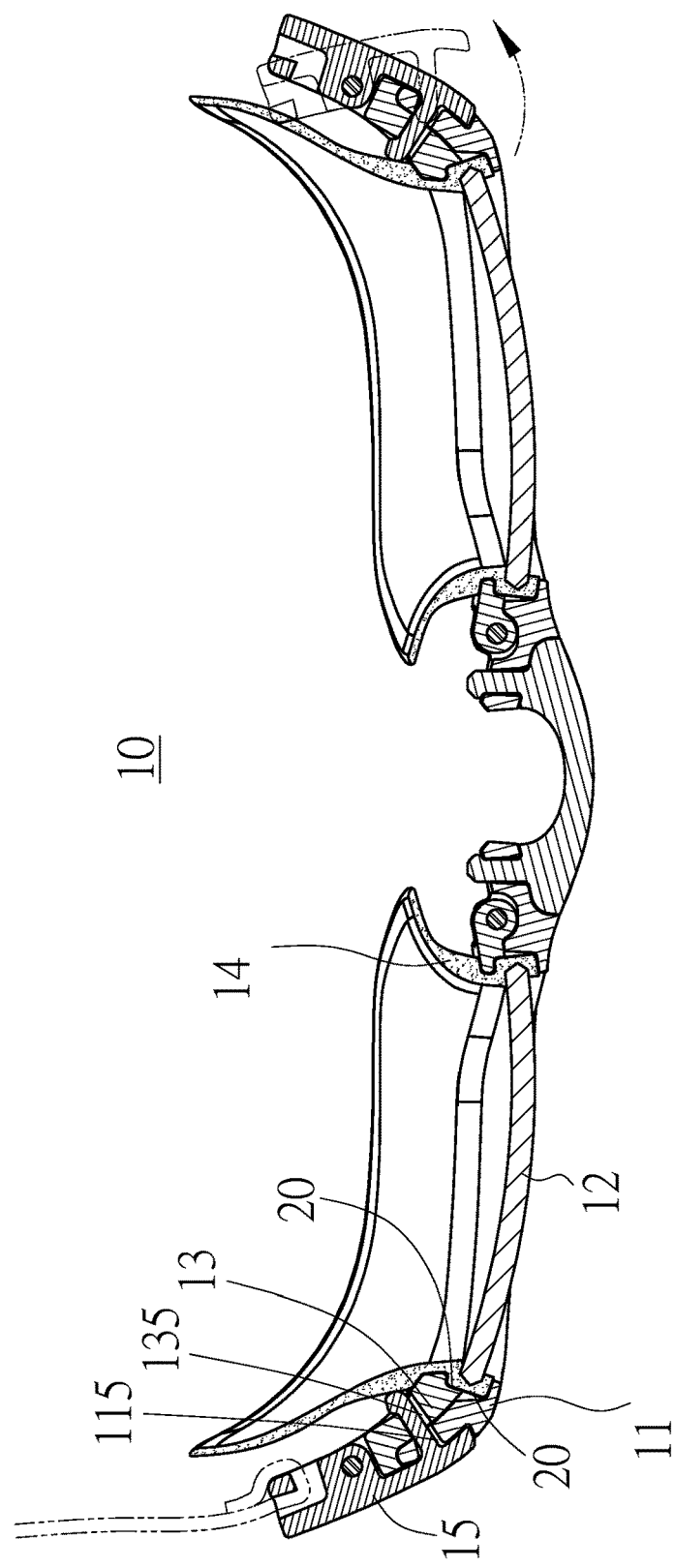
FIG. 4 shows a top view of the pair of goggles with replaceable lenses in accordance with the preferred embodiment of the present disclosure.

According to the preferred embodiment of the present disclosure, as shown in FIG. 1 and FIG. 2, when the at least lens 12 is replaced, the at least one fastener 15 is pivoted for opening; and the main frame body 11 and the secondary frame body 13 are separated so that the soft frame body 14 is taken out and the at least one lens 12 is removed subsequently. On the other hand, when assembling the at least one lens 12, the main frame body 11 and the secondary frame body 13 are respectively provided with a pair of recesses 20 relative to each other (as shown in FIG. 4). The pair of recesses 20 holds and fixes the soft frame body 14; and the main frame body 11 and the secondary frame body 13 are fastened by the at least one fastener 15 so that the at least one lens 12 is fixed inside the soft frame body. Accordingly, the at least one lens 12 is not easy to fall off.

As shown in FIG. 1 and FIG. 2, the present disclosure may further include a connecting piece 16. The connecting piece 16 is able to connect the left main frame 111 and the right main frame 112 through the connecting hole 113.

Moreover, the present disclosure may further include a first pivot member 17. The first pivot member 17 may pivot the left main frame 111 and the left secondary frame 131 through the main hole 114 and may pivot the right main frame 112 and the right secondary frame 132 through the secondary hole 133.

Further, the present disclosure may further include a second pivot member 18. The second pivot member 18 may pivot the secondary main frame body 13 and the at least one fastener 15 through a first pivot hole 134 on both sides of the secondary frame body 13 and a second pivot hole 151 of the at least one fastener 15.

Specifically, as shown in FIG. 1 and FIG. 2, when assembling the at least one lens 12, the at least one lens 12 is disposed inside a lens slot 141 of the soft frame body 14. Both sides of the main frame body 11 and the secondary frame body 13 are respectively provided a pair of recesses 20 relative to each other. The pair of recesses 20 holds and fixes the soft frame body 14. The main frame body 11 includes a main fastening hole 115 on both sides, and the secondary frame body 13 includes a secondary fastening hole 135 on both sides. The at least one fastener 15 is buckled into the main fastening hole 115 and the secondary fastening hole 135 so as to fasten the main frame body 11 and the secondary frame body 13. Therefore, the at least one lens 12 is fixed inside the soft frame body 14.

According to the preferred embodiment of the present disclosure, as shown in FIG. 1 and FIG. 2, it is to be noted that no tools need to be used when replacing or assembling the at least one lens 12. Therefore, any one of lenses 12 can be quickly replaced or assembled. That is to say, when the wear's eyesight increases or decreases, either one of the lenses 12 can be replaced and assembled separately without the need to re-purchase a pair of goggles. In addition, for parallax wearers, different eyeglass prescription lenses can be replaced and assembled.

It is worth mentioning that the at least one lens 12 may be one of a non-eyeglass prescription lens, an eyeglass prescription lens and a colored lens. In other words, when the wearer swims in the outdoor swimming pool, lenses 12 can be changed to colored lenses or dark lenses.

According the pair of goggles with replaceable lenses of the present disclosure, as shown in FIG. 4, when the at least one lens 12 is replaced, the at least one fastener 15 is pivoted for opening. The main frame body 11 and the secondary frame body 13 are separated so that the soft frame body 14 is taken out. Accordingly, the at least one lens 12 is removed. On the other hand, when assembling the at least one lens 12, both sides of the main frame body 11 and the secondary frame body 13 are respectively provided with a pair of recesses 20 relative to each other. The pair of recesses 20 holds and fixes the soft frame body 14, and the main frame body 11 and the secondary frame body 13 are fastened by the at least one fastener 15 so that the at least one lens is 12 fixed inside the soft frame body 14. As such, according to the present disclosure, at least one lens can be effectively/quickly replaced or assembled. When a wear's eyesight increases or decreases, either one of lenses can be replaced or assembled separately. In addition, lenses having the same diopter are commonly available on the market. Therefore, wearers who have parallax can only accommodate lenses which have the same diopter. However, at least one lens can be quickly replaced or assembled on the goggles according to the present disclosure.

In summary, according to the pair of goggles with replaceable lenses of the present disclosure, the present disclosure has the following advantages. The pair of goggles with replaceable lenses provided by the present disclosure allows a wearer to quickly replace or assemble at least one lens, is easy to assemble and is not easy to fall off. Moreover, for parallax wearers, the present disclosure also allows wearers to wear lenses which have different diopters. Additionally, when wearers swims in the outdoor swimming pool, lenses can be changed to colored lenses or dark lenses.

Although the present disclosure has been described with reference to the preferred exemplary preferred embodiments thereof, it is apparent to those skilled in the art that a variety of modifications and changes may be made without departing from the scope of the present disclosure which is intended to be defined by the appended claims.

What is claimed is:

1. A pair of goggles with replaceable lenses, comprising:
   a main frame body, at least one lens, a secondary frame body, a soft frame body and at least one fastener; and
   a second pivot member, pivoting the secondary main frame body and the least one fastener through a first pivot hole on both sides of the secondary frame body and a second pivot hole of the at least one fastener,
   wherein when the at least lens is replaced, the at least one fastener is pivoted for opening; and the main frame body and the secondary frame body are separated so that the soft frame body is taken out and the at least one lens is removed,
   wherein when assembling the at least one lens, the main frame body and the secondary frame body are respectively provided with a pair of recesses; the pair of recesses holds and fixes the soft frame body; and the main frame body and the secondary frame body are fastened by the at least one fastener so that the at least one lens is fixed inside the soft frame body.

2. The pair of goggles with replaceable lenses of claim 1, wherein the main frame body comprises a left main frame and a right main frame; the secondary frame body comprises a left secondary frame and a right secondary frame; the left main frame and the right main frame are respectively provided with a connecting hole and a main hole at the bridge of the nose; and the left secondary frame and the right secondary frame are respectively provided with a secondary hole.

3. The pair of goggles with replaceable lenses of claim 1, further comprising: a connecting piece, connecting a left main frame and a right main frame of the main frame body through a connecting hole.

4. The pair of goggles with replaceable lenses of claim 1, further comprising: a first pivot member, pivoting a left main frame of the main frame body and a left secondary frame of the secondary frame body through a main hole and pivoting a right main frame of the main frame body and a right secondary frame of the secondary frame body through a secondary hole.

5. The pair of goggles with replaceable lenses of claim 1, wherein the main frame body has a main fastening hole on both sides; the secondary frame body has a secondary fastening hole on both sides; and the at least one fastener is buckled into the main fastening hole and the secondary fastening hole so as to fasten the main frame body and the secondary frame body.

6. The pair of goggles with replaceable lenses of claim 1, wherein when replacing or assembling the at least one lens, no tools need to be used.

7. The pair of goggles with replaceable lenses of claim 1, wherein the at least one lens is one of a non-eyeglass prescription lens, an eyeglass prescription lens and a colored lens.

8. A pair of goggles with replaceable lenses, comprising:
a main frame body, at least one lens, a secondary frame body, a soft frame body and at least one fastener,
wherein when the at least one lens is replaced, the at least one fastener is pivoted for opening; and the main frame body and the secondary frame body are separated so that the soft frame body is taken out and the at least one lens is removed,
wherein when assembling the at least one lens, the main frame body and the secondary frame body are respectively provided with a pair of recesses; the pair of recesses holds and fixes the soft frame body; and the main frame body and the secondary frame body are fastened by the at least one fastener so that the at least one lens is fixed inside the soft frame body,
wherein the main frame body has a main fastening hole on both sides; the secondary frame body has a secondary fastening hole on both sides; and the at least one fastener is buckled into the main fastening hole and the secondary fastening hole so as to fasten the main frame body and the secondary frame body.

9. The pair of goggles with replaceable lenses of claim 8, wherein the main frame body comprises a left main frame and a right main frame; the secondary frame body comprises a left secondary frame and a right secondary frame; the left main frame and the right main frame are respectively provided with a connecting hole and a main hole at the bridge of the nose; and the left secondary frame and the right secondary frame are respectively provided with a secondary hole.

10. The pair of goggles with replaceable lenses of claim 8, further comprising: a connecting piece, connecting a left main frame and a right main frame of the main frame body through a connecting hole.

11. The pair of goggles with replaceable lenses of claim 8, further comprising: a first pivot member, pivoting a left main frame of the main frame body and a left secondary frame of the secondary frame body through a main hole and pivoting a right main frame of the main frame body and a right secondary frame of the secondary frame body through a secondary hole.

12. The pair of goggles with replaceable lenses of claim 8, further comprising: a second pivot member, pivoting the secondary main frame body and the least one fastener through a first pivot hole on both sides of the secondary frame body and a second pivot hole of the at least one fastener.

13. The pair of goggles with replaceable lenses of claim 8, wherein when replacing or assembling the at least one lens, no tools need to be used.

14. The pair of goggles with replaceable lenses of claim 8, wherein the at least one lens is one of a non-eyeglass prescription lens, an eyeglass prescription lens and a colored lens.

* * * * *